June 24, 1941.  H. T. KRAFT  2,246,978
FRICTION DEVICE
Filed July 26, 1939  2 Sheets-Sheet 2

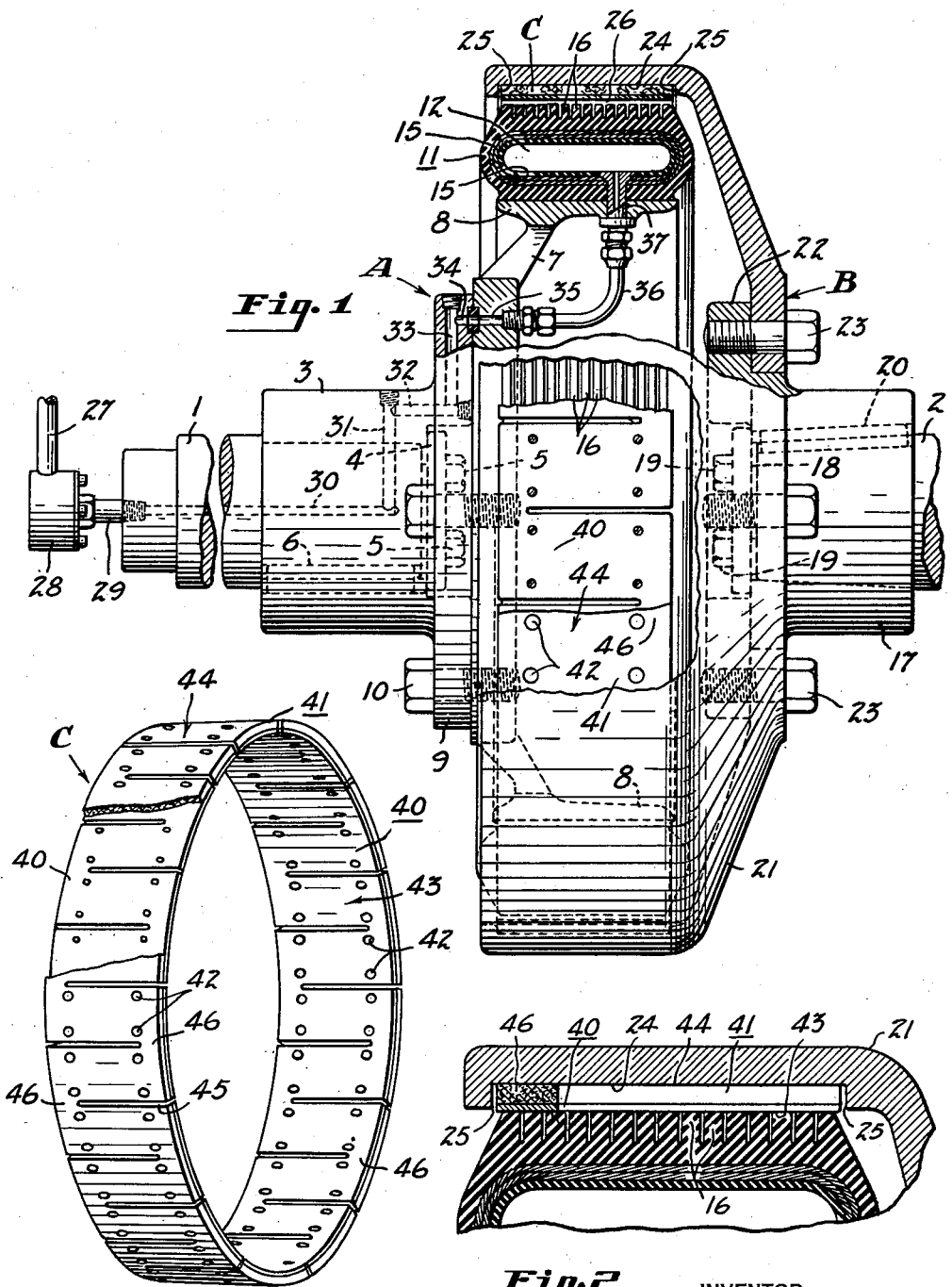

INVENTOR
HERMAN T. KRAFT
BY
ATTORNEYS

Patented June 24, 1941

2,246,978

UNITED STATES PATENT OFFICE 2,246,978

FRICTION DEVICE

Herman T. Kraft, Akron, Ohio, assignor to The General Tire & Rubber Company, Akron, Ohio, a corporation of Ohio Application July 26, 1939, Serial No. 286,664

9 Claims. (Cl. 192—88)

This invention relates to devices for frictionally resisting relative movement between structural members, and more particularly to the improvement of devices or structures for resisting relative rotational movement between members having confronting faces which frictionally engage one another. There are a number of devices now employed in the mechanical arts which include relatively movable members which are arranged to be brought into frictional engagement with one another so as to resist relative movement. Common applications of this arrangement may be found in conventional brake and clutch structures. The present invention may be used to advantage in many of the friction devices of this character, and the principles involved are fundamental and substantially the same for the many possible applications. Therefore, the description and explanation, which is made in connection with a clutch arrangement, is applicable, in so far as the mode of operation and essentials of the invention are concerned, to other devices.

Where there is relative movement between members of a brake or clutch device and one of the members is brought into frictional engagement with the other while the relative movement continues, the slippage that occurs until the relative movement is arrested generates heat which may have a deleterious effect on one or both of the contacting members. For example, where one of the members is formed of metal and the other is formed of a resilient yieldable composition such as rubber and the like, the heat generated by the frictional engagement of the parts may cause the rubber to burn or disintegrate, resulting in early deterioration of the rubber member. Furthermore, the sliding between the parts subjects both contacting faces to excessive wear which necessitates replacement or repair and increases the cost of up-keep on devices of this character.

It is, therefore, a principal object of the invention to provide in frictional devices of the character mentioned, improved means for reducing wear of the friction surfaces on the movable members and to reduce the deleterious effects of the heat generated by the frictional engagement of the parts.

Another object is to provide in a friction device having a resilient deformable element with a relatively soft yieldable friction face, means for protecting such face from the heat generated in the device during frictional engagement of the parts.

Another object is to provide means which may be interposed between the relatively movable parts of a frictional device to be subjected thereby to the major portion of the wear which occurs while relative movement between the parts is being frictionally resisted; more specifically, an object is to provide a slide element for use in a friction device, which slide may be interposed between the frictional faces of such device so that the slide may be frictionally engaged on opposite sides by friction faces moving relative to one another.

A still further object is to provide in a friction brake or clutch structure having substantially cylindrical friction faces disposed in confronting relation to one another, annular means disposed between the faces and rotatable relative to both faces but arranged to be squeezed between the faces so that it is frictionally engaged on both sides to transmit the torque between the members solely through frictional engagement therewith. Other objects and advantages will become apparent from the following detailed description of suitable embodiments of the invention, made in connection with the accompanying drawings, in which:

Fig. 1 is a view partly in section and with parts removed showing a clutch construction incorporating the present invention;

Fig. 2 is a fragmentary sectional detail showing the manner in which the slide element is frictionally engaged between the relatively movable parts of the clutch structure of Fig. 1;

Fig. 3 is a perspective view with part removed showing the annular slide element;

Figure 4:
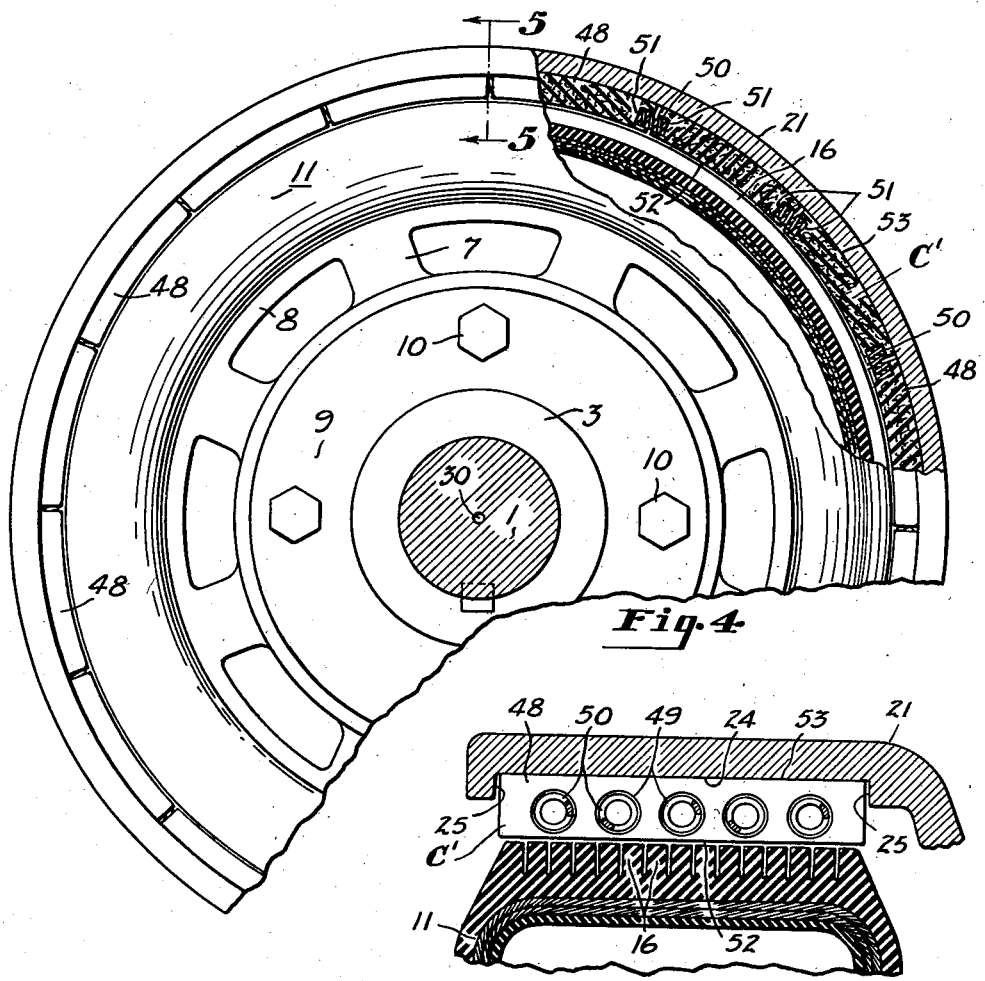
Fig. 4 is a sectional view with parts removed of a clutch structure similar to that shown in the preceding figures, illustrating a modification of the invention.

It is contemplated that in its preferred form the invention will be embodied in a structure in which one surface of the slide is normally maintained resiliently pressed against a face of a first of a pair of relatively movable members for substantially constant frictional engagement therewith, while another surface of the slide is engaged by a second of the relatively movable members during periods when a driving or like connection is to be maintained between the members and is disengaged when the members are to move freely relative to one another. The arrangement is such that when the disengaged member is brought into frictional engagement with the slide there will be an initial period of sliding movement between the parts until the second or disengaged member "picks up" the slide so that the latter moves therewith through frictional engagement. When the slide is thus "picked up" it will move relative to the first member, with which it remains in constant frictional engagement, so that sliding occurs therebetween. As the pressure between the parts is continued or increased, the frictional force between the slide and the first member resists the relative movement therebetween until it ceases altogether. Meanwhile, there has been little or no relative movement between the slide and the second member after the "picking up" of the slide so that when the relative movement between the slide and the first member is arrested, relative movement between the members is likewise arrested and the heat has been generated primarily at the friction face of the first member and relatively little heat has been generated at the friction face of the second member. By making the first member of a suitable metal it can withstand and dissipate the heat while affording a relatively smooth even face for frictional sliding engagement with the slide. Since the second member is subjected to but little heat and slippage it may be made of rubber or the like which will provide a more positive non-slipping engagement with the slide as well as permitting deformation in effecting engagement and disengagement of the parts and in absorbing sudden torque loads or shocks.

The clutch structure illustrating an application of the invention and shown in the drawings, comprises relatively movable members, indicated generally by the letters A and B, between which is disposed a slide element C to be frictionally engaged by both members A and B. The members A and B are both rotatable and are mounted, respectively, on shafts 1 and 2, either one of which may be a driven shaft so that a driving connection may be established through the members A and B. Member A comprises a hub 3 secured on the shaft by any suitable means such for example as an end plate 4 which is held in place by bolts 5. A key 6 is provided to prevent rotation of the hub 3 on the shaft 1. Wheel 7 having a substantially cylindrical rim 8 is secured to a flange portion 9 at one end of the hub 3 by means such as bolts 10.

Mounted on the outwardly directed, substantially cylindrical periphery of the rim 8 is a deformable friction element 11 of annular form. This element may be of conventional design preferably comprising a yieldable carcass of rubber or the like having an internal chamber 12 which extends circumferentially about the element so that the same may be expanded by inflation. Desirably, suitable reinforcing means such as layers of weftless cord fabric 15 may be used to strengthen the structure of the friction element. The inner periphery of the rubber annulus is secured to the rim 8 of the rotatable member by any suitable means such as vulcanization, while the outer periphery of the element is formed with a friction face which may resemble the road-engaging tread portion of a conventional pneumatic vehicle tire. For example, the outer periphery of the element 11 may be formed with a multiplicity of circumferentially extending, relatively thin flexible ribs 16, the outer edges of which cooperatively provide an outwardly directed, substantially cylindrical friction face.

The movable member B comprises a hub 17 which corresponds to the hub 3 of the member A, being secured on a tapered end portion of shaft 2 by end plate 18 attached by bolts 19. A key 20 prevents rotation of the hub on the shaft. Disposed about the wheel 7 and friction element 11 is a drum 21 which is open at one end, the other end being secured to a flange portion 22 of the hub 17 by means of bolts 23. On the inside of the drum 21 is formed an inwardly directed, substantially cylindrical face 24 which is disposed about the friction face of the deformable element 11 in spaced confronting relation with respect thereto.

As is customary in clutch structures, brakes and the like of this character, the drum 21 or at least that portion on which is formed the face 24, is made of strong metal such for example as cast iron or steel, although brass, bronze, or other alloys might be used. Accordingly, the cylindrical face 24 is of metal which may be dressed to a smooth, relatively hard finish.

Disposed in the space between the confronting faces of the members A and B is the ringlike slide element C which is relatively thin and flat in section, being of sufficient width to extend across substantially the entire width of the peripheral friction face of the element 11. The element C is freely supported between the members A and B so as to be rotatable relative to both. Suitable means is provided to prevent shifting of the slide C in a direction parallel to the axis of rotation of the members A and B. As shown in the drawings, one method is to recess the face 24 in the drum 21 so as to provide spaced parallel shoulders 25 which extend radially inward along opposite edges of the face 24 so as to be engageable with the side edges of the slide element C.

In Fig. 1 the device is shown with the resilient friction element 11 partially deflated so that the peripheral friction face thereof is retracted and the members A and B are released from one another for independent movement. Thus, either the member A or the member B may be driven or rotated without imparting a like movement or rotation to the other since the friction face on the element 11 is substantially concentric with respect to the metal face 24 on the inside of the drum 21.

Preferably, the slide element C is of sufficient size so that it normally remains in resilient engagement with the metal face 24, and upon retraction of the friction element 11 by deflation of the same, the friction face of the element 11 separates from the slide C, leaving an annular space 26 which circumferentially separates the parts. Inflation and deflation of the friction annulus 11 is effected by means of a suitable valve arrangement and a source of fluid or compressed air supply (not shown) which connect to the clutch structure through a conduit 27 and rotatable connector 28 and conduit 29. The latter is threaded into an aperture in one end of the shaft 1, communicating with a longitudinal passage 30 therein which communicates by means of passages 31, 32, 33, and 34 in the hub 3 with a passage 35 in the wheel 7. A conduit 36 connects the passage 35 with a suitable valve stem 37 which communicates with the chamber 12 in the deformable elastic element 11. When it is desired to effect a driving connection between members A and B a suitable fluid under pressure, such as compressed air, is introduced into the chamber 12 through the conduit 27 and other passages mentioned above, so as to distend the elastic element 11 and cause the ribbed friction face thereof to move radially outward against the slide C.

A preferred construction of the slide C is shown in Fig. 3 and comprises an inner band 40 of resilient springlike material such as brass or steel, and an outer band or layer 41 of a relatively soft yieldable material such as is commonly employed for the lining of brake shoes and the like for automobiles. The inner and outer linings may be secured together in any suitable manner such, for example, as by the use of rivets, indicated at 42. These rivets may be countersunk in the outer band 41 similarly to the manner in which they are customarily countersunk in the lining of automobile brakes, so as to prevent contact between the rivets and the drum face 24 as the outer band wears. The ends of the rivets 42 on the inside of the slide are finished substantially flush with inwardly directed cylindrical surface 43 of the inner band 40, or may be slightly countersunk, so that a relatively smooth, unobstructed surface is presented to the ribs 16 which form the friction face of the deformable annulus 11. Similarly, the outer band 41 presents an unobstructed, outwardly directed, substantially cylindrical friction surface 44 for engagement with the metal face 24 of the drum 21.

Slits 45 are formed in an alternating series around the slide C. These slits extend inwardly from opposite side edges of the slide in alternate relation to permit expansion and contraction of the slide. Accordingly, the slide is in effect a series of arcuate bars fastened together at their ends by relatively narrow connecting portions, indicated at 46 (Fig. 2). In making the slide C it is designed so that in its normal or stressed shape it is of ringlike form having an outer diameter, that is, the diameter across the outer peripheral surface 44, slightly greater than the diameter across the inwardly directed cylindrical face 24 of the drum 21. Accordingly, in placing the slide C within the drum the slide is circumferentially compressed and the springlike character of the inner band 40 which tends to return to its normal shape, retains the outer band 41 resiliently pressed against the confining face 24.

Mechanical drive installations employing a clutch device of the character shown are usually arranged so that the member A is the drive member actuated by a suitable source of power and the member B is the driven member, being connected to the instrumentality to be operated. Assuming that this is the arrangement in the present case, and the resilient annulus 11 is retracted so that there is no driving connection between the members A and B, such a connection may be established by introducing fluid into the chamber 12 to distend the resilient friction element 11 in the manner previously described. Assuming also, that either the member A or the member B is being rotated while the other is idle or rotating at a different rate of speed, there will be relative rotational movement between the members of the clutch. Since the slide C normally remains in frictional engagement with the face 24, there is little or no relative movement between the element C and the member B. There is, however, relative rotational movement between the element C and the element A. Hence, as the resilient annulus 11 is distended so that the ribs 16 engage the metal surface 43 of the slide C, some slippage initially occurs until sufficient friction is developed to rotate the slide C synchronously with the friction element 11. Normally, this requires but a relatively short time interval because of the relatively small mass and movement of inertia of the element C, so that the heat developed at the surface 43 between the slide C and the face of the rubber friction element 11 is relatively small. When the rubber friction element thus drives or "picks up" the slide C, relative rotation occurs between the slide C and the drum 21 with the relatively soft peripheral friction surface 44 of the slide element C slipping on the smooth metal face 24 of the drum. As the pressure within the chamber 12 is increased to distend the friction element 11 with an increasing force, the frictional engagement between the friction surface 44 of the slide and the face 24 of the drum is likewise progressively increased until the torque load is overcome and the member B rotates synchronously with the member A. When this occurs, no sliding takes place at either the inner surface 43 or the outer surface 44 of the slide C. Furthermore, it is to be understood that the coefficient of friction between the rubber ribs 16 and the metal surface 43 of the slide is sufficiently greater than the coefficient of friction between the face 24 of the drum 21 and the friction surface 44 of the slide element C, so that slippage primarily occurs between the latter surfaces except during a relatively short time interval when the driving connection is initiated and until the friction element 11 "picks up" the slide C. Accordingly, since the slippage occurs between the slide C and the face 24, the heat generated is largely localized in this region. Thus the rubber friction element 11 is protected from the deleterious effects of the heat generated during engaging and disengaging the clutch to materially prolong the life thereof.

Figure 5:
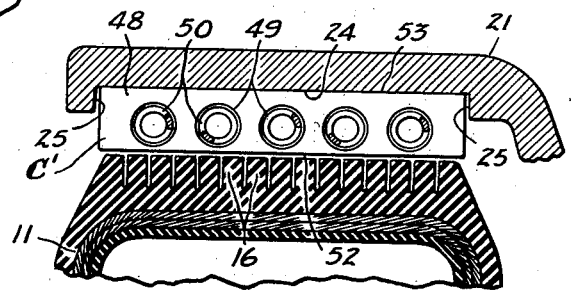
Fig. 5 is a fragmentary detail in section, taken substantially on the line 5—5 of Fig. 4, and enlarged with respect thereto.
Figure 6:
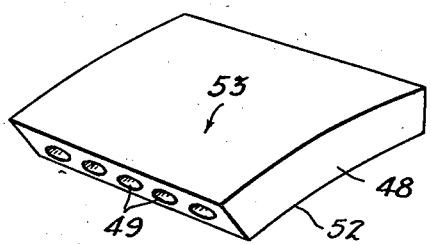
Fig. 6 is a perspective view of one of the arcuate blocks employed in the slide element of the embodiment shown in Figs. 4 and 5.

In Figs. 4 through 6 is illustrated a slide element C' of modified construction. The other parts of the clutch device may be substantially the same as those illustrated in the preceding figures, and, accordingly, have been identified by the same numerals of reference. This modified type of slide element comprises a series of curved or arcuate blocks 48 which are disposed in end to end relation in the form of an annular band which completely encircles the face of the deformable friction element 11 and is received against the face 24 of the drum 21 and between the shoulders 25. In the ends of each of the blocks 48 are formed aligned bores or apertures 49 which receive helical compression springs 50. These springs seat against opposed bottoms 51 of the bores 49 so as to urge the blocks 48 apart. Since the blocks are arranged in the form of a ring the effect of the springs 50 is to urge the blocks radially outward against the inwardly directed face 24 of the drum. Thus the operation of the friction element C' is similar to that of the element C shown in Figs. 1 through 3.

In making the blocks 48, any suitable material having the desired wear and heat resisting properties may be used. For example, there are on the market a number of compositions employed in the manufacture of molded linings for automobile brakes. The composition of such linings, which may include asbestos, together with rubber and a suitable binding material, may be used to mold or otherwise form the blocks 48.

In this embodiment of the invention the slide element C' has an inner friction surface 52 which is engaged by the outwardly directed friction face on the deformable annulus 11. The slide C' also has an outwardly directed, substantially cylindrical friction surface 53 which is engageable with the inwardly directed cylindrical surface 24 of the drum 21. In constructing the blocks 48 of a molded composition the surface 52 and the surface 53 will both have substantially the same coefficient of friction. However, the edges of the rubber ribs 16 engage the inner surface 52 with a much greater frictional effect than that of the face 24 on the surface 53. Accordingly, relative sliding movement occurs primarily between the surface 53 and face 24 rather than between the friction surface 52 and the face on the friction element 11, except during initiation of a driving connection.

The present invention thus provides a slide for use in a friction device which is freely mounted for rotative movement relative to both of the movable members. The slide is arranged to normally remain resiliently pressed against a metal surface of one of the members for synchronous movement therewith, except during periods of initiating or arresting of a driving connection between the relatively movable members of the friction device. When the relatively soft, yieldable member of the friction device is brought into engagement with the slide element, the latter moves therewith and slides relative to the metal face of the member with which it was previously moving synchronously. Thus, the heat generating slippage, which occurs in friction devices of the character discussed, is confined primarily to a metal surface of one of the movable members and a relatively softer surface of the unique slide element of the present invention. Furthermore, the relatively soft rubber friction element 11 is insulated from the generated heat and relieved of a large portion of the slippage so that it is not subjected to the abuse that would otherwise occur without the use of the slide element. It is to be observed that rotational movement of the slide element C, that is to say, the movement of the element in the same direction as the relative movement between the members A and B, is governed wholly through the sliding friction between the element C and the parts of the members A and B respectively. There is no necessity for the use of auxiliary connectors or attaching devices for connecting the slide element C to either the drum 21 or the friction element 11. Thus the parts of the friction device are not subjected to stress or strain due to movement of the slide and the slide may be used in present-day friction devices with but a minimum alteration or modification of their structure.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim is:

1. A device of the character described comprising a first member having a metal face, a second member having secured thereto a relatively soft yieldable element of a deformable composition material, said element having a friction face disposed in spaced relation to the metal face, and one of the members being movable relative to the other, a slide disposed between the faces and freely supported for movement relative to both members in the direction of movement of said movable member, said slide having on one side a metal surface directed toward the friction face and on the other side a relatively soft composition material with a friction surface directed toward said metal face, and means for forcing the friction face of the element toward the metal face to squeeze the slide therebetween while one member is moving relative to the other whereby the friction face engages the metal surface of the slide and the metal face engages the friction surface of the slide to frictionally arrest the relative movement between the members.

2. A device of the character described comprising a first member having a substantially cylindrical metal face, a second member having secured thereto a relatively soft yieldable element of a deformable composition material, said element having an annular friction face disposed in spaced relation to the metal face, an annular slide disposed between the faces and freely supported for rotational movement relative to both members, one side of said slide being normally resiliently pressed against the metal face to be frictionally restrained thereby against relative rotational movement, said slide having slits extending inwardly from opposite side edges thereof in alternate relation to permit expansion and contraction of the slide in accommodating itself to the faces, and means for forcing the friction face of the element toward the metal face to squeeze the slide therebetween while one member is moving relative to the other whereby the friction face engages the other side of the slide to frictionally arrest relative rotational movement between the members.

3. A device of the character described comprising a first member having a substantially cylindrical metal face, a second member having secured thereto a relatively soft yieldable element of a deformable composition material, said element having an annular friction face disposed in spaced relation to the metal face, an annular slide disposed between the faces and freely supported for rotational movement relative to both members, said slide including a substantially annular metal band and a layer of heat resistant composition material secured to the band and having a friction surface directed toward the metal face, said band having a metal surface directed toward the friction face of the element, and means for forcing the friction face toward the metal face to squeeze the slide therebetween.

4. A slide element for interposition between friction faces of a clutch structure and the like comprising a plurality of arcuate blocks disposed in end to end relation in the form of an annulus, each block having sliding surfaces on opposite sides thereof to provide a substantially annular sliding surface on one side of the annulus and a substantially annular sliding surface on the other side of the annulus, and means connecting the ends of the blocks.

5. A slide element for interposition between friction faces of a clutch structure comprising an annulus presenting inwardly and outwardly directed sliding surfaces, one surface being formed by a relatively thin band of flexible metal and the other surface being formed by a composition material softer than the metal and having a greater coefficient of friction, and means providing radial expansion and contraction of the band.

6. A device of the character described comprising a rotatable drum having an inwardly directed metal friction face, a wheel disposed within the drum and having secured thereon an inflatable rubber annulus provided with a peripheral relatively yieldable rubber friction face in confronting relation to the metal face, a substantially circular circumferentially resilient and compressible friction element positioned under circumferential compression between the rubber and metal faces, the resiliency of the compressed element holding the same against the drum face and there normally being a clearance between the element and the rubber face, and means through which air under pressure can be forced into the annulus to inflate the same and expand the rubber face thereof into engagement with the friction element and thereby establish a frictional driving connection between the drum and wheel, the friction between the drum face and the element being less than between the annulus face and the element whereby sliding occurs between the drum and the friction element to accommodate differences in rotational velocities between the drum and the wheel.

7. A device of the character described comprising a first member having a relatively hard circular friction face, a second member having secured thereto a relatively soft yieldable element of a deformable and resilient composition material, said element having an annular friction face of said resilient composition material disposed in spaced confronting relation to said hard friction face, an annular and circumferentially resilient slide disposed between the faces and freely supported for rotational movement relative to both members, said slide being normally under circumferential stress, whereby the inherent resiliency thereof normally presses one side of said slide against one of the friction faces, to be frictionally restrained thereby against relative rotational movement, and means for forcing the resilient friction face of the element toward the relatively hard friction face to squeeze the slide therebetween while one member is moving relative to the other to frictionally arrest relative rotational movement between the members.

8. A device of the character described comprising a rotatable drum having an inwardly directed metal friction face, a wheel disposed within the drum and having secured thereon an inflatable rubber annulus provided with a peripheral relatively yieldable rubber friction face in confronting reation to the metal face, and a circumferentially resilient annular friction element positioned between the rubber and metal faces, said element being rotatable relative to the drum and wheel and normally being under circumferential stress, whereby the inherent resiliency thereof normally presses one side of the element against one of the friction faces to be frictionally restrained thereby against relative rotational movement.

9. A slide element for interposition between friction faces of a clutch structure comprising an annulus presenting inwardly and outwardly directed sliding surfaces, one surface being formed by a relatively thin band of flexible metal and the other surface being formed by a composition material softer than the metal and having a greater coefficient of friction, and slits extending inwardly from opposite side edges of the annulus to provide for circumferential elongation of the annulus.

HERMAN T. KRAFT.